United States Patent
Kauffmann et al.

(10) Patent No.: US 10,584,627 B2
(45) Date of Patent: Mar. 10, 2020

(54) MANIFOLD

(71) Applicant: TENNECO GMBH, Edenkoben (DE)

(72) Inventors: Steffen Kauffmann, Römerberg (DE);
Markus Geminn, St. Martin (DE);
Andreas Steigert, Lambrecht (DE);
Margit Roth, Freimersheim (DE)

(73) Assignee: TENNECO GMBH, Edenkoben (DE)

( * ) Notice: Subject to any disclaimer, the term of this patent is extended or adjusted under 35 U.S.C. 154(b) by 170 days.

(21) Appl. No.: 15/559,645

(22) PCT Filed: Sep. 19, 2016

(86) PCT No.: PCT/EP2016/072109
§ 371 (c)(1),
(2) Date: Sep. 19, 2017

(87) PCT Pub. No.: WO2017/050671
PCT Pub. Date: Mar. 30, 2017

(65) Prior Publication Data
US 2018/0334946 A1    Nov. 22, 2018

(30) Foreign Application Priority Data
Sep. 22, 2015 (DE) ..................... 10 2015 116 018

(51) Int. Cl.
*F01N 13/10* (2010.01)
*F01N 13/14* (2010.01)
(Continued)

(52) U.S. Cl.
CPC .............. *F01N 13/107* (2013.01); *F01N 1/02* (2013.01); *F01N 13/102* (2013.01);
(Continued)

(58) Field of Classification Search
CPC .... F01N 13/107; F01N 13/102; F01N 13/143; F01N 2470/28; F01N 13/1805; F01N 13/1861; F01N 13/1888; F02B 37/02
See application file for complete search history.

(56) References Cited

U.S. PATENT DOCUMENTS

| 4,168,610 A | 9/1979 | Engquist |
| 4,288,988 A | 9/1981 | Curtil |

(Continued)

FOREIGN PATENT DOCUMENTS

| CN | 200958421 Y | * 10/2007 |
| DE | 1576357 B2 | 12/1977 |

(Continued)

OTHER PUBLICATIONS

DE-10144015, Translation, Machine Translated on Jul. 9, 2019.*
(Continued)

*Primary Examiner* — Patrick D Maines
(74) *Attorney, Agent, or Firm* — Hudak, Shunk & Farine Co. LPA

(57) ABSTRACT

A manifold system for an internal combustion engine, having a housing, which is designed as a collecting manifold and which has two inlet openings and an outlet opening for the flow connection of two outlets of an internal combustion engine to an exhaust system and at most two connection openings provided on the housing for connecting a double-shell inner air-gap-insulated manifold. An exhaust system is developed in such a way that, at the same time, the tone of the exhaust gas noise and thus of the exhaust system is optimized over a plurality of important rotational speed ranges of the internal combustion engine by a modular assembly. For this purpose, at least one separate inner air-gap-insulated manifold having a connection opening, an inlet opening, and an outlet opening is provided, which is connected to the housing by the outlet opening, and at least (Continued)

one separate outer air-gap-insulated manifold having an inlet opening and an outlet opening is connected to the connection opening of the inner air-gap-insulated manifold. All air-gap-insulated manifolds are completely formed of sheet metal, and each air-gap-insulated manifold has a separate one- or multi-part inner shell and a one- or multi-part separate outer shell. All inner air-gap-insulated manifolds are structurally or geometrically identical and all outer air-gap-insulated manifolds are structurally or geometrically identical, wherein the inner air-gap-insulated manifolds are not structurally identical and not geometrically identical to the outer air-gap-insulated manifolds.

20 Claims, 3 Drawing Sheets

(51) Int. Cl.
    *F01N 13/18*     (2010.01)
    *F01N 1/02*     (2006.01)
    *F02B 37/02*     (2006.01)
(52) U.S. Cl.
    CPC ....... *F01N 13/143* (2013.01); *F01N 13/1805* (2013.01); *F01N 13/1861* (2013.01); *F01N 13/1888* (2013.01); *F02B 37/02* (2013.01); *F01N 2470/28* (2013.01)

(56) References Cited

U.S. PATENT DOCUMENTS

| | | | |
|---|---|---|---|
| 4,644,747 A | | 2/1987 | Petersen |
| 5,784,881 A | * | 7/1998 | Otsuka .................. F01N 13/10 |
| | | | 285/299 |
| 6,293,098 B1 | | 9/2001 | Coates |
| 6,427,440 B1 | | 8/2002 | Bonny et al. |
| 7,328,685 B2 | | 2/2008 | Mockenhaupt et al. |
| 2005/0072143 A1 | * | 4/2005 | Diez .................. F01N 13/102 |
| | | | 60/321 |
| 2008/0308193 A1 | | 12/2008 | Igarashi |
| 2009/0158588 A1 | * | 6/2009 | Nording .............. F01N 13/1811 |
| | | | 29/890.08 |
| 2009/0158724 A1 | * | 6/2009 | Muller .................. F01N 13/102 |
| | | | 60/323 |
| 2015/0267597 A1 | * | 9/2015 | Fischer ................ F01N 13/143 |
| | | | 60/323 |

FOREIGN PATENT DOCUMENTS

| | | | | |
|---|---|---|---|---|
| DE | 39 25 802 A1 | | 2/1991 | |
| DE | 9417314.1 U1 | | 2/1995 | |
| DE | 4339290 A1 | | 5/1995 | |
| DE | 19644707 A1 | | 4/1998 | |
| DE | 198 19 946 A1 | | 11/1999 | |
| DE | 19909934 C1 | | 1/2001 | |
| DE | 101 02 637 A1 | | 7/2002 | |
| DE | 101 44 015 A1 | | 3/2003 | |
| DE | 10144015 A1 | * | 3/2003 | ............... F01N 3/28 |
| DE | 10149381 A1 | | 5/2003 | |
| DE | 103 01 395 A1 | | 7/2004 | |
| DE | 10328027 A1 | | 1/2005 | |
| DE | 102005031272 A1 | | 1/2007 | |
| DE | 10 2006 004 725 A1 | | 8/2007 | |
| DE | 102009060003 A1 | | 7/2011 | |
| DE | 10 2011 106 242 A1 | | 12/2012 | |
| DE | 10 2014 103 804 A1 | | 9/2015 | |
| EP | 1291500 B1 | | 3/2003 | |
| EP | 1 914 401 A2 | | 4/2008 | |
| EP | 1914401 A2 | * | 4/2008 | ........... F01N 13/102 |
| FR | 2 886 338 A1 | | 12/2006 | |
| FR | 2 947 301 A1 | | 12/2010 | |
| JP | S6223518 A | | 1/1987 | |
| JP | S63162918 A | | 7/1988 | |
| JP | 11-324668 A | | 11/1999 | |
| JP | 11324668 A | * | 11/1999 | |
| JP | 2003293764 A | | 10/2003 | |
| JP | 2005508253 A | | 3/2005 | |
| JP | 3940497 A | | 7/2007 | |
| JP | 2007278156 A | | 10/2007 | |
| WO | 7900623 A1 | | 9/1979 | |
| WO | 2014/133511 A1 | | 9/2014 | |

OTHER PUBLICATIONS

EP-1914401, Translation, Machine Translated on Jul. 9, 2019.*
CN-200958421, Translation, Machine Translated on Jul. 9, 2019.*
JP-11324668, Translation, Machine Translated on Jul. 9, 2019.*

* cited by examiner

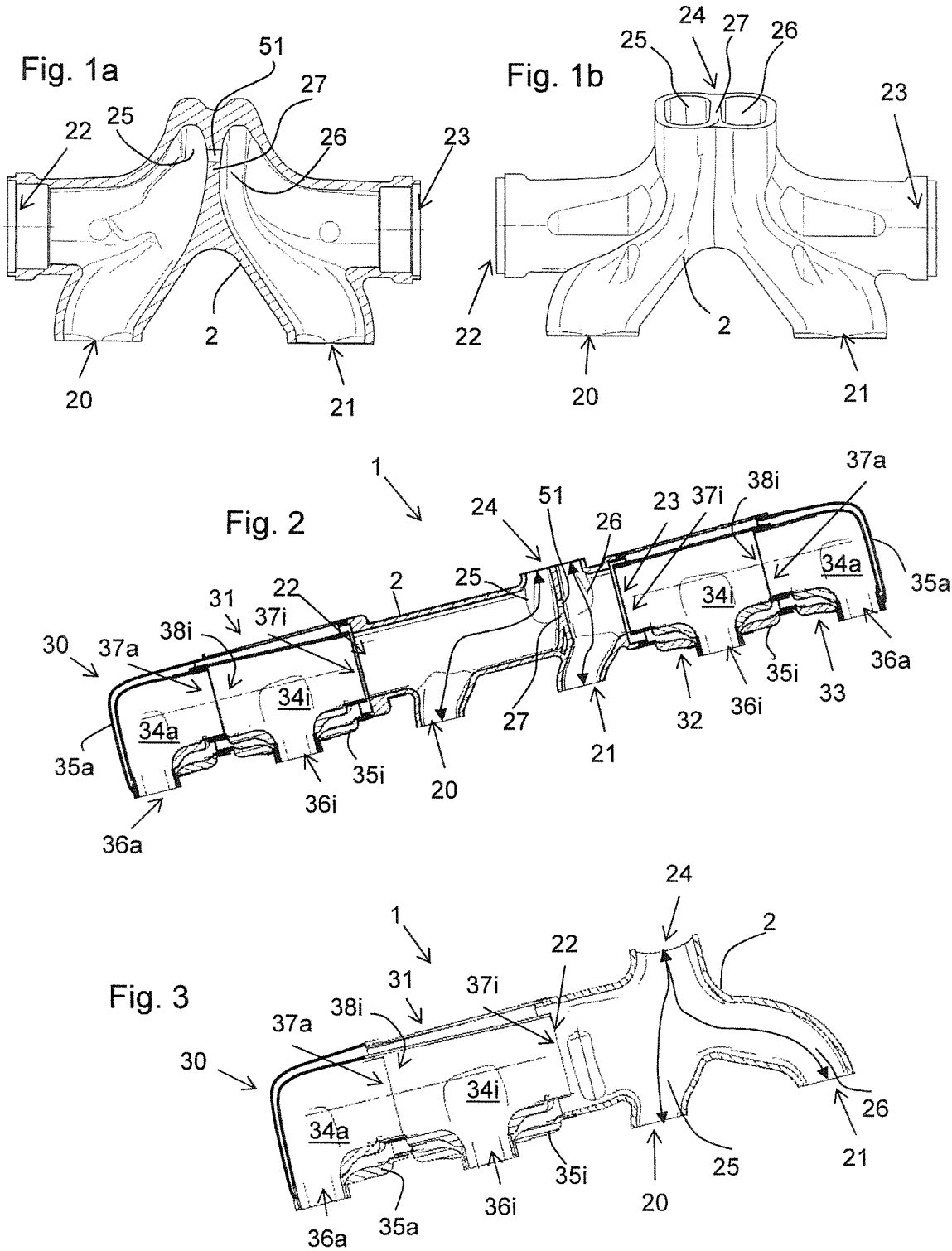

MANIFOLD

FIELD OF THE INVENTION

The invention relates to a manifold system for an internal combustion engine, comprising a housing configured as a collecting manifold, which housing has two inlet openings and an outlet opening for fluidically connecting two outlets of an internal combustion engine to an exhaust gas system. A maximum of two connection openings are located at the housing for connecting a double-shell inner air gap insulated manifold.

BACKGROUND OF THE INVENTION

The term 'air gap insulated manifold' is used to describe air gap insulated manifolds having an inner shell and an outer shell, which can be installed individually as a separate component. Such a separate air gap insulated manifold is always only assigned to an outlet opening on the engine side and does not form a collecting manifold, which combines a plurality of outlet openings on the engine side.

Air gap insulated manifolds which are connected in flow direction to the housing formed as a collecting manifold are described as inner air gap insulated manifolds. Those air gap insulated manifolds which are connected to the respective inner air gap insulated manifolds in the flow direction, are described as outer gap insulated manifolds.

Inlet opening, outlet opening or connection opening are to be understood as the respective end of the pipes or a housing which is connected by further connection means, such as flanges or welded material, to another pipe or housing leading further away.

A housing for an internal combustion engine configured as a collecting manifold with a plurality of exhaust gas conduits is already known from EP 1 914 401 A2, one end of which having an exhaust gas inlet opening can be connected to an outlet of the internal combustion engine and the other end of which is connected to a collecting device having an exhaust gas outlet opening. A first exhaust gas conduit is formed as a casting from the outlet of the internal combustion engine to the collecting device. On both sides of this collecting device a further collecting manifold is connected, by means of which two outlets of the internal combustion engine are brought together. The two collecting manifolds are configured as air gap insulated manifolds.

An identical design of the exhaust gas conduit with a total of three collecting manifolds is described in DE 101 44 015 A1, in which the central part is formed as a double-walled, air gap insulated collecting housing made of sheet metal.

DE 39 25 802 A1 describes a casting for the connection of six outlets of an internal combustion engine to an exhaust gas system, serving as an adapter for six manifold pipes.

According to DE 103 01 395 A1, a double-walled housing configured as a collecting manifold is known, in which four connection openings are provided for the four outlets of the internal combustion engine.

DE 10 2011 106 242 A1 describes a system made of individual manifolds, each of which are inserted into each other in the number of the outlets of the internal combustion engine.

DE 10 2014 103 804 A1 describes both internally and externally identical air gap insulated manifolds.

SUMMARY OF THE INVENTION

The object of the present invention is to further develop an exhaust gas system so that, with a modular system, the sound of the exhaust gas noise and thus of the exhaust gas system is optimized across several important rpm ranges of the internal combustion engine at the same time. Each average engine has between four and six outlets, which can be individually equipped due to the modular design of the system. The geometry of the exhaust gas system is thereby specifically adapted to the acoustics.

The problem is solved according to the invention in that at least one separate inner air gap insulated manifold is provided with a connection opening, an inlet opening and an outlet opening, said separate inner air gap insulated manifold being connected with the outlet opening to the housing, and at least one separate outer air gap insulated manifold is provided with an inlet opening and an outlet opening, said separate outer air gap insulated manifold being connected with the outlet opening to the connection opening of the inner air gap insulated manifold. All air gap insulated manifolds are completely formed from sheet metal and have a separate single-piece or multiple-piece inner shell and a separate single-piece or multiple-piece outer shell. All inner and all outer air gap insulated manifolds are structurally or geometrically identical, wherein the inner air gap insulated manifolds are not structurally and not geometrically identical to the outer air gap insulated manifolds.

An air gap insulated manifold, which has its own inner shell and its own outer shell, is described as a separate air gap insulated manifold. In contrast to this, a plurality of manifolds having a joint outer or inner shell are not described as separate in accordance with this invention.

Due to the different geometry between inner and outer manifold, advantageous resonance behavior is produced in air gap insulated manifolds. In particular, it has been found that reflection surfaces which are aligned perpendicularly to the flow direction adversely affect the resonance behavior, which is why the outer air gap insulated manifold is bent in its geometry from its inlet opening to the outlet opening, said geometry deviating from that of the inner air gap insulated manifold.

The inner air gap insulated manifold is directly connected with its outlet opening to the collecting manifold and is connected by means of its connection opening to the outlet opening of an outer air gap insulated manifold. As a result, a single air gap insulated manifold as well as two air gap insulated manifolds can be connected to a collecting manifold on both sides. The manifold system with two sheet metal manifolds for a 4-cylinder internal combustion engine can be supplemented by two additional identical sheet metal manifolds to form a manifold system for a 6-cylinder internal combustion engine. The connection openings which conduct the exhaust gas, the inlet opening and the outlet opening are formed by the inner shell.

The different geometry has a particularly advantageous effect if the size of a distance $A2$ on the housing between one of the two inlet openings and the outlet opening is between 30 mm and 300 mm or between 50 mm and 120 mm. The advantageous acoustics are influenced by the relevant frequencies and/or the harmonics of very different orders in such applications. The wavelength of the relevant frequencies and/or the harmonics thereof correlates with the claimed distances as relevant factor. It is true that it has not been possible to determine a relationship which can be deduced strictly mathematically or physically between the distances and the harmonics, but it has been possible to determine the advantages by means of multiple and, in part, complex series of experiments.

Due to the different geometry of the air gap insulated manifolds connected to the collecting manifold with respect to the air gap insulated manifolds connected to the housing, an acoustics is accomplished between the outlet and the collecting pipe which sounds more harmonious than known manifold systems, especially in 6-cylinder inline engines. This improvement is especially beneficial when a definite size of a distance A2 between one of the two inlet openings and the outlet opening exists, which varies between 50 mm and 120 mm, depending on the model of the manifold system. In the case of shorter distances with the advantage of a small design size, it has been found that the sonic behavior is already very much affected with slight changes in the distances. An increasing of the distance, on the other hand, produces advantageous sonic properties.

Such manifold systems will be used preferably in truck diesel engines or stationary diesel engines in which a turbocharger is arranged adjacent to the collecting manifold. The housing, configured as the central and load-bearing part, constitutes the necessary statics for the connection of the turbocharger to the outlets on the engine housing.

It is especially advantageous for this when the distance is dimensioned as a function of sound waves of the exhaust gas whose wavelength is calculated in terms of n*A2 or 1/n*A2, n being an element of the natural numbers, but not zero. Here, A2 is the above described size of the distance between one of the two inlet openings and the outlet opening. L is the mean physical wavelength of sound, calculated from the quotient of the speed of propagation C [m/s =meters per second] of the sound in the exhaust gas and the frequency f [1/s=Hertz] of the wave. At an exhaust gas temperature of 700° C. and a frequency of 300 Hertz [Hz], one gets a wavelength of around 750 mm. This signal with 300 Hz is generated, for example, by a 6-cylinder engine at 3000 revolutions per minute [rpm]. This low-frequency signal would be accentuated with a distance of ⅒ of the wavelength, i.e., with a distance A2 of 75 mm in the housing.

It can also be advantageous for the acoustics if the two inlet openings within the housing stand in a fluidic and acoustic exchange with each other, which further enhances the harmonization, because a dynamic equalization can occur inside the housing.

It can thereby be advantageously provided that the collecting manifold or the housing is configured as a single-piece casting. The vibrational behavior of a casting is very advantageous compared to that of a sheet metal part, insofar as the acoustics of collecting manifolds is concerned.

Moreover, it can be beneficial in the case of cast housings if the two inlet openings are separated in the housing by a duct wall and two flow ducts are formed by the duct wall, wherein both flow ducts empty into the outlet opening at the end of the duct wall and the two flow ducts stand in fluidic and acoustic exchange via a leakage in the form of an opening or perforation provided upstream of the outlet opening in the duct wall. In this way, the properties of an absolute group separation without any acoustic and flow-dynamic interaction and without any crosstalk between the two manifold regions adjoining the flow ducts are coupled with the properties without group separation and with full acoustic and flow-dynamic interaction. The opening or perforation provided in the duct wall reduces the flow-dynamic interaction, but at the same time the acoustic interaction remains largely intact. The degree of the acoustic interaction varies both with the distance between one of the two inlet openings and the outlet opening and with the rpm, because the interaction decreases with increasing rpm depending on the size of the opening as a constrained leakage point.

It can be of special importance to the present invention when the collecting manifold is formed from a low-alloy gray cast iron with a carbon content of at least 1.00 wt. % and further alloy additions each with a mean content of not more than 50.00 wt. %. Such materials known as gray cast iron have a beneficial acoustic vibration behavior.

It can also be beneficial if the opening or the perforation has an overall cross section between 4 mm$^2$ and 500 mm$^2$. The leakage is dependent on the respective pipe cross section for an advantageous resonance behavior.

Alternatively, it can be advantageous when the housing is formed entirely of sheet metal, as a double-walled part, and also air gap insulated with a single-piece or multiple-piece outer housing and a single-piece or multiple-piece inner housing. The acoustic disadvantages of the sheet metal can be compensated by a special shaping of the outer housing. At the same time, the housings can be formed as a single piece from folding shells or as multiple pieces from an upper shell and a lower shell.

In the case of sheet metal housings it is advantageous if the inner housing is mated at the connection opening with the inner shell of the inner air gap insulated manifold at the outlet opening of the inner air gap insulated manifold, and a leakage in the form of a joining gap having an average width between 0.4 mm and 1.2 mm is thereby formed between the inner housing and the inner shell.

It is also advantageous if the outer air gap insulated manifolds do not have a connection opening and are configured in the form of an arc. This avoids reflection surfaces which extend at right angles to the flow direction.

Moreover, it can be advantageous when the inner air gap insulated manifold is joined to the housing by a bonding technique, such as welding or soldering or gluing. In particular, the welded connection offers a very simple and economical fabrication method for a collecting manifold made of gray cast iron. For reasons of flexible installation it can also be advantageous to connect the air gap insulated manifold to the collecting manifold by form fitting with a union nut or a V-band clamp or a flange connection or a clamping element.

Moreover, it can be of advantage when the housing has only one connection opening by which two air gap insulated manifolds are connected directly or indirectly. This asymmetrical design has acoustic benefits over the symmetrical design for special applications.

Finally, it can be of advantage when the housing connects the outlet openings to a housing of a turbocharger and for this purpose forms a load-bearing structural part arranged between the engine block and the turbocharger.

BRIEF DESCRIPTION OF THE DRAWINGS

Further advantages and details of the invention are explained in the patent claims and in the specification and represented in the figures. There are shown:

FIG. 1a, a sectional view of a housing configured as a collecting manifold with flow ducts being in interaction;

FIG. 1b, a side view of the collecting manifold of FIG. 1a;

FIG. 2, a sectional view of a manifold system with a collecting manifold with flow ducts being in interaction and two inner and two outer air gap insulated manifolds;

FIG. 3, a sectional view of a manifold system with a collecting manifold with flow ducts being in interaction and an inner air gap insulated manifold and an outer air gap insulated manifold;

DETAILED DESCRIPTION OF THE INVENTION

Figure 4:
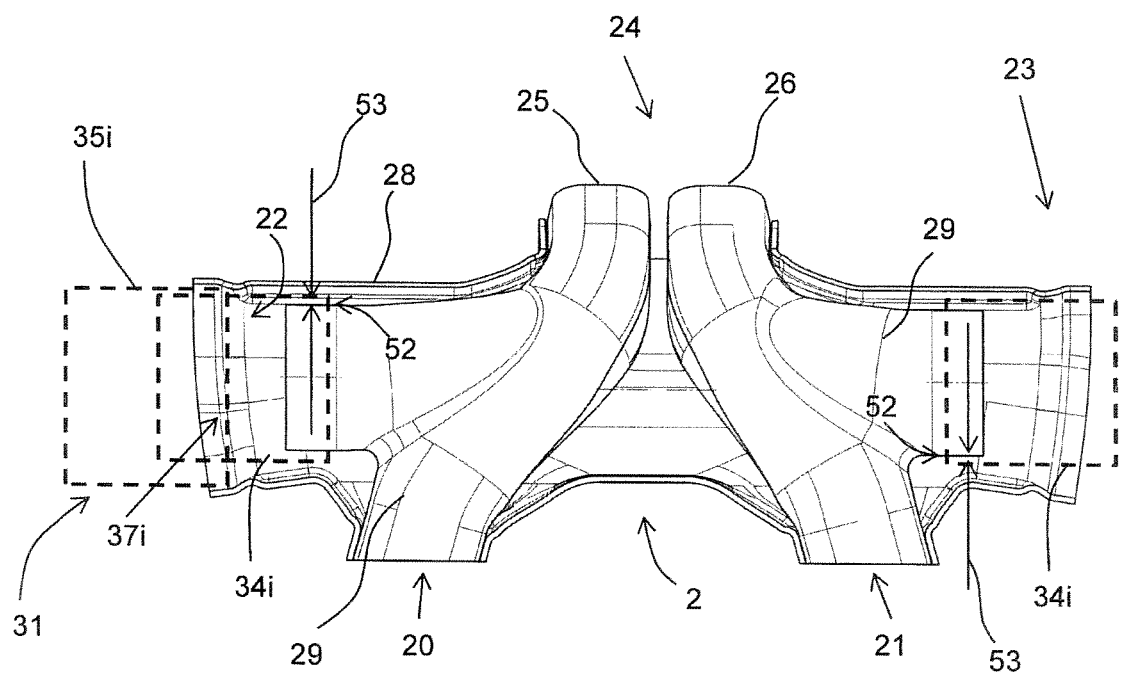
FIG. 4, a double-wall collecting manifold made of sheet metal.
Figure 5:
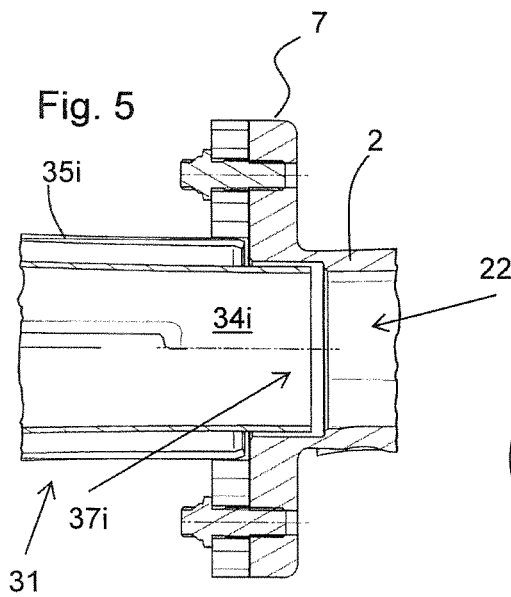
FIG. 5, a sectional view of a flange connection between collecting manifold and air gap insulated manifold.
Figure 6:
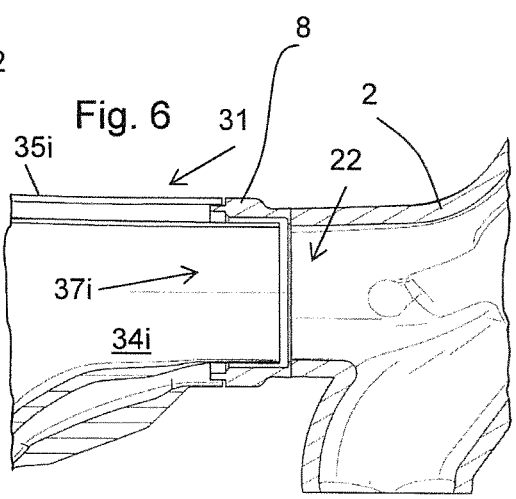
FIG. 6, a sectional view of a connection between collecting manifold and air gap insulated manifold via an inlay in the collecting manifold.
Figure 7A:
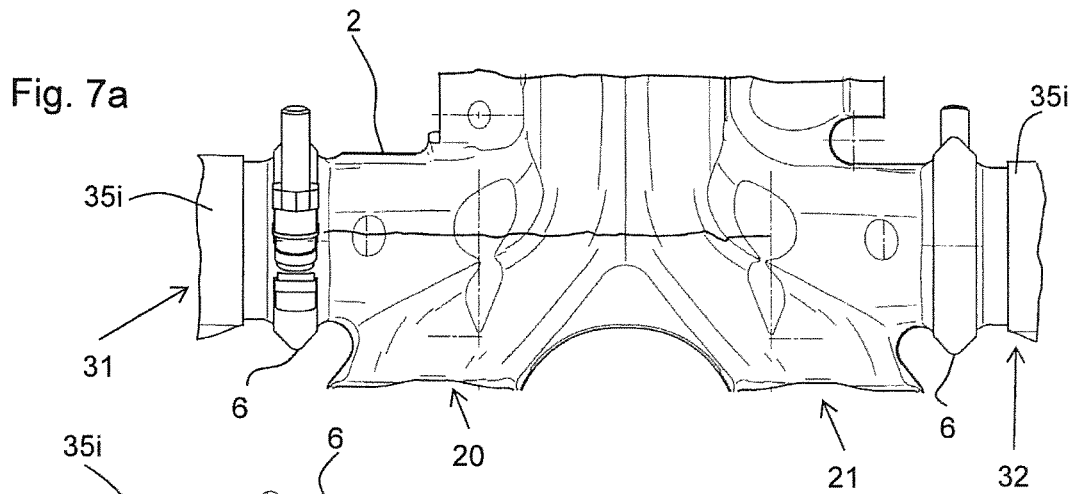
FIG. 7a, a view of a collecting manifold with V-bank clamp arranged at both sides.
Figure 7B:
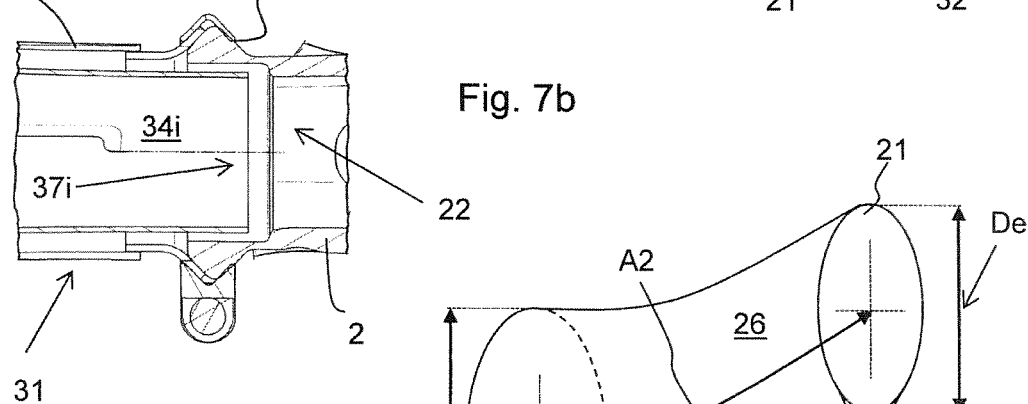
FIG. 7b, a sectional view of a V-bank clamp connection between collecting manifold and air gap insulated manifold.

According to all of the embodiment examples a housing 2 is provided, having two inlet openings 20, 21 for connecting the housing 2 to outlets (not represented) of an internal combustion engine as well as one to two connection openings 22, 23 for connecting one air gap insulated manifold 30-31 each. Within the context of the cylinder sequence of an internal combustion engine having inner and outer cylinders, the "inner" air gap insulated manifolds 31, 32 in each case are arranged between the housing 2 and an outer air gap insulated manifold 30, 33, and the "outer" air gap insulated manifolds 30, 33 are arranged opposite the housing 2 on the respective inner air gap insulated manifold 31, 32.

FIG. 1a shows a sectional view of a housing 2 configured as a collecting manifold with flow ducts 25, 26 being in interaction. The housing 2 is formed from a gray cast iron and as well as the two inlet openings 20, 21 for connecting the housing 2 to outlets (not represented) of an internal combustion engine it also has two connection openings 22, 23, each for an inner air gap insulated manifold 31, 32. From the two inlet openings 20, 21, two flow ducts 25, 26 arranged alongside each other and partly separated by a duct wall 27 extend inside the housing 2 up to an outlet opening 24 of the housing 2, represented in FIG. 1b. To improve the acoustic properties of the collecting manifold 2, the two flow ducts 25, 26 interact with each other across a leakage formed as an opening 51 in the duct wall 27, which allows so-called crosstalk.

In the embodiment example of a manifold system 1 shown in FIG. 2, the housing 2 is not symmetrical in design, but as in the embodiment example of FIGS. 1 a and 1 b it has two connection openings 23 for one inner air gap insulated manifold 31, 32 each as well as the two inlet openings 20, 21. An outer air gap insulated manifold 30, 33 is connected with its outlet opening 37a to the respective inner air gap insulated manifold 31, 32 to the connection opening 38i thereof. The inner air gap insulated manifolds 31, 32 are all configured geometrically identically in a T shape with three openings 36i, 37i, 38i. The outer air gap insulated manifolds 30, 33 are configured geometrically identically to one another in the form of an arc having just two openings 36a, 37a.

From the two inlet openings 20, 21 of the housing 2, two flow ducts 25, 26 extend inside the housing 2 up to the outlet opening 24 of the housing 2. Here as well, the two flow ducts 25, 26 are partly separated in their interaction by a duct wall 27. The average length of the two flow ducts 25, 26 represented by arrows corresponds to a distance A2, more closely described in FIGS. 8a and 8b, between the respective inlet opening 20, 21 and the outlet opening 24. In this embodiment example, the distances A2 differ by a factor of 1.6.

FIG. 3 shows a housing 2 for a manifold system 1 for an internal combustion engine with four cylinders arranged in line. The housing 2 has only one connection opening 22 for an inner air gap insulated manifold 31 with a T-shaped geometry. An outer air gap insulated manifold 30 in the form of an arc is connected to this inner air gap insulated manifold 31. In this housing 2, no reduction in the interaction between the two flow ducts 25, 26 by a duct wall 27 is provided.

FIG. 4 shows an air gap insulated housing 2, which is configured as a collecting manifold. The housing 2 has an outer housing 28 and two inner housings 29 integrated in the outer housing 28.

The housing 2 is configured as a load-bearing part and connects the outlets of the engine block (not represented) to a housing of a turbocharger (not represented). On both sides, inner air gap insulated manifolds (not represented) are connected to the housing 2, not having any load-bearing or statically relevant function.

All air gap insulated manifolds 30 have an inner shell 34i, 34a and an outer shell 35i, 35a surrounding the inner shell 34i, 34a. At least at the respective inlet openings 36i, 36a, the respective inner shell 34i, 34a and the respective outer shell 35i, 35a are joined together flush in one of the flow directions.

The plug-in connection between the inner shells 34i of the connected inner air gap insulated manifolds 31, 32 and the inner housing 29 forms a joining gap 52, which also produces a leakage. The width 53 of the joining gap 52 varies, for example, with the diameter of the inner housing 29 and is between 0.4 mm and 1.2 mm. As a result of this leakage, the crosstalk between the two inner housings 29 is made possible in this embodiment example as well. The respective inner air gap insulated manifold 31-32 is sealed with respect to the housing 2 by means of the connection of the outer shell 35i with the housing 2. The connection between the housing 2 and the outer shell of the respective air gap insulated manifold 31, 32 is preferably formed as a welded connection. Alternatively, a connection as a flange 7 or inlay 8 or V-band clamp 6 is provided according to FIGS. 5-7b.

The inner and outer air gap insulated manifolds 30-33 shown in the embodiment examples are formed from sheet metal. Air gap insulated sheet metal manifolds demonstrate an advantageous resonance behavior. Due to the different shaping of the inner and the outer air gap insulated manifolds 30-33, the acoustic features are additionally improved at particular operating points of the internal combustion engine, because the vibration behavior and resonance behavior harmonize.

Figure 8A:
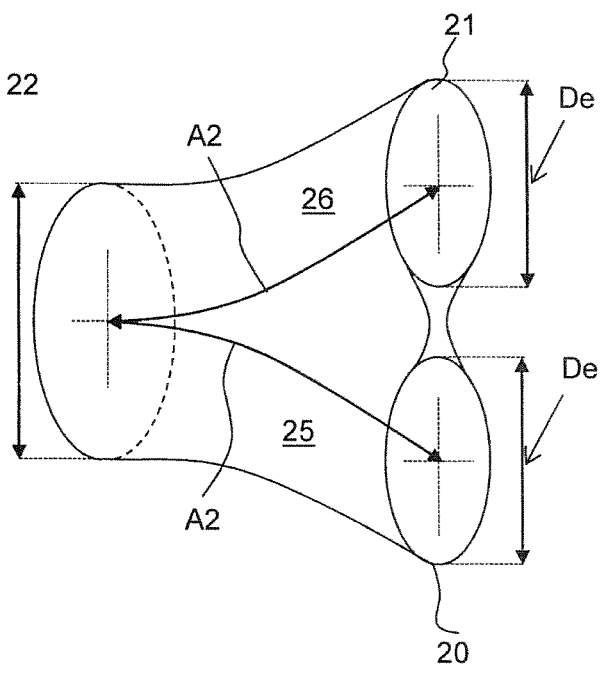
FIG. 8a, a schematic representation of the distance between an inlet opening and the outlet opening in a collecting manifold as seen from above.
Figure 8B:
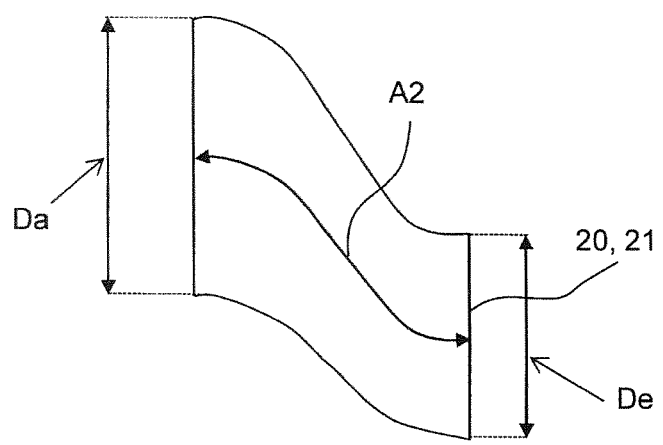
FIG. 8b, a schematic representation of the distance between an inlet opening and the outlet opening in a collecting manifold in side view.

The distance A2 represented in FIGS. 8a and 8b between the respective inlet opening 20, 21 and the outlet opening 24 is also dependent on the size ratios of the respective diameters De of the inlet openings 20, 21 to the diameters Da of the outlet opening 24. For an optimal acoustic adaptation to the most important operating points of the internal combustion engine, especially in regard to the relevant rpm for the most important load regions, the distances A2, the diameter ratios De, Da and the identical shape of the corresponding openings of the air gap insulated manifolds 30-33 are thus relevant.

What is claimed is:

1. A manifold system for an internal combustion engine, comprising:

a) a housing configured as a collecting manifold, which housing has two inlet openings and an outlet opening for fluidically connecting two outlets of an internal combustion engine to an exhaust gas system, and b) a maximum of two connection openings provided on the housing for connecting a double-shell inner air gap insulated manifold, wherein c) at least one separate inner air gap insulated manifold is provided with a connection opening, an inlet opening and an outlet opening, said separate inner air gap insulated manifold being connected with the outlet opening to the housing, and d) at least one separate outer air gap insulated manifold is provided with an inlet opening and an outlet opening, said separate outer air gap insulated manifold being connected with the outlet opening to the connection opening of the inner air gap insulated manifold, and e) all air gap insulated manifolds are completely formed from sheet metal and have a separate single-piece or multiple-piece inner shell and a separate single-piece or multiple-piece outer shell, and f) all inner air gap insulated manifolds are geometrically identical and all outer air gap insulated manifolds are geometrically identical, and g) wherein the inner air gap insulated manifolds are not structurally or geometrically identical to the outer air gap insulated manifolds.

2. The manifold system according to claim 1, wherein a size of a distance (A2) on the housing between one of the two inlet openings and the outlet opening is between 30 mm and 300 mm.

3. The manifold system according to claim 2, wherein the size of a distance (A2) on the housing between one of the two inlet openings and the outlet opening is between 50 mm and 120 mm.

4. The manifold system according to claim 2, wherein the two inlet openings within the housing stand in a fluidic and acoustic exchange with each other.

5. The manifold system according to claim 4, wherein the housing is configured as a single-piece casting.

6. The manifold system according to claim 5, wherein the two inlet openings are separated in the housing by a duct wall and two flow ducts are formed by the duct wall, wherein both flow ducts empty into the outlet opening at the end of the duct wall and the two flow ducts stand in fluidic and acoustic exchange via a leakage in the form of an opening or perforation provided upstream of the outlet opening in the duct wall.

7. The manifold system according to claim 6, wherein the opening or the perforation has an overall cross section between 4 $mm^2$ and 500 $mm^2$.

8. The manifold system according to claim 4, wherein the housing is formed entirely of sheet metal, as a double-walled part, and also air gap insulated with a single-piece or multiple-piece outer housing and a single-piece or multiple-piece inner housing.

9. The manifold system according to claim 8, wherein the inner housing at the connection openings is mated with the inner shell of the inner air gap insulated manifold at the outlet opening of the inner air gap insulated manifold and a leakage in the form of a joining gap having an average width between 0.4 mm and 1.2 mm is thereby formed between the inner housing and the inner shell, and wherein the outer air gap insulated 1) do not have a connection opening for connecting a further double shell air gap insulated manifold and 2) are configured in the form of an arc.

10. A system consisting of the manifold system according to claim 9, and an internal combustion engine.

11. The manifold system according to claim 1, wherein the two inlet openings within the housing stand in a fluidic and acoustic exchange with each other.

12. The manifold system according to claim 1, wherein the housing is configured as a single-piece casting.

13. The manifold system according to claim 12, wherein the two inlet openings are separated in the housing by a duct wall and two flow ducts are formed by the duct wall, wherein both flow ducts empty into the outlet opening at the end of the duct wall and the two flow ducts stand in fluidic and acoustic exchange via a leakage in the form of an opening or perforation provided upstream of the outlet opening in the duct wall.

14. The manifold system according to claim 13, wherein the opening or the perforation has an overall cross section between 4 $mm^2$ and 500 $mm^2$.

15. The manifold system according to claim 1, wherein the housing is formed entirely of sheet metal, as a double-walled part, and also air gap insulated with a single-piece or multiple-piece outer housing and a single-piece or multiple-piece inner housing.

16. The manifold system according to claim 15, wherein the inner housing at the connection openings is mated with the inner shell of the inner air gap insulated manifold at the outlet opening of the inner air gap insulated manifold and a leakage in the form of a joining gap having an average width between 0.4 mm and 1.2 mm is thereby formed between the inner housing and the inner shell.

17. The manifold system according to claim 1, wherein the outer air gap insulated manifolds 1) do not have a connection opening for connecting a further double shell air c/ap insulated manifold and 2) are configured in the form of an arc.

18. The manifold system according to claim 1, wherein the housing has only one connection opening.

19. The manifold system according to claim 1, wherein the housing connects the outlet openings to a housing of a turbocharger and for this purpose forms a load-bearing structural part arranged between the engine block and the turbocharger.

20. A system consisting of the manifold system according to claim 1, and an internal combustion engine.

* * * * *